United States Patent [19]

Schnitzer

[11] 4,037,798
[45] July 26, 1977

[54] CEREAL MILL
[76] Inventor: Johann Georg Schnitzer, Feldbergstrasse 26, 7742 St. Georgen, Germany
[21] Appl. No.: 613,866
[22] Filed: Sept. 16, 1975
[30] Foreign Application Priority Data

| Sept. 16, 1974 | Germany | 2444151 |
| Sept. 16, 1974 | Germany | 2444150 |
| Oct. 4, 1974 | Germany | 2447380 |

[51] Int. Cl.² .............................................. B02C 7/14
[52] U.S. Cl. ................................. 241/101.2; 241/246; 241/259.1
[58] Field of Search .................. 241/101.1, 101.2, 157, 241/162, 245, 246, 248, 258, 259, 259.1

[56] References Cited
U.S. PATENT DOCUMENTS

| 133,455 | 11/1872 | King | 241/162 |
| 755,989 | 3/1904 | Baker et al. | 241/246 |
| 1,189,035 | 6/1916 | Asbury et al. | 241/101.2 X |
| 2,896,867 | 7/1959 | De Angelis et al. | 241/259 |
| 3,109,949 | 11/1963 | Hartwig et al. | 241/101.1 X |
| 3,488,008 | 1/1970 | Bodine | 241/259 X |

Primary Examiner—Granville Y. Custer, Jr.
Attorney, Agent, or Firm—Lackenbach, Lilling & Siegel

[57] ABSTRACT

An accessory for kitchen blenders, and the like, adapted to the milling of cereal grains comprises a pair of superposed millstones of circular shape. The lower millstone is engaged upon a shaft which may be coupled to the drive of the kitchen machine after placing a receptacle for the milled flour around the blender stand. The upper millstone is held stationary in a housing which also serves as the container and funnel for the grain. The driveshaft passes through an orifice in the upper millstone and depends from a thrust bearing centered in a cover atop the housing, the shaft being engaged by an adjusting nut above the thrust bearing to permit adjustment of the gap between the upper and nether millstones, for the control of flour fineness.

26 Claims, 11 Drawing Figures

CEREAL MILL

BACKGROUND OF THE INVENTION

The invention relates to a cereal mill adapted to serve as an accessory to a common kitchen machine, such as a blender. It relates, more particularly, to such a cereal mill wherein a pair of coaxial, circular millstones are utilized and wherein the lower millstone is driven rotationally with respect to a stationary upper millstone.

Cereal mills for household use are known in which one of the the co-operating millstones is driven through a hand-operated crank. Such devices of the prior art are cumbersone to operate, require the expenditure of considerable energy to produce even small quantities of flour and do not possess means for controlling the fineness of the milled product.

It is, therefore, a primary object of the invention to provide a cereal mill which is adapted to be driven by an electrical motor, advantageously by an electric drive commonly found in kitchens and associated with blenders and their like.

It is a further object of the invention to provide means for the adjustment of the milling pressure, and of the flour fineness, in a simple and reliable manner.

It is an additional object of the invention to teach the construction of such an accessory for the milling of cereals which utilizes the existing components of a kitchen machine to the fullest, is economical to manufacture, simple to assemble and to use, and trouble-free in operation.

SUMMARY OF THE INVENTION

The foregoing objects, and other objects and advantages which shall become apparent in the detailed description of the preferred embodiment thereof below, are attained in a device which provides for a receptacle to store the milled product, a vertical shaft coupled to the drive of the parent kitchen machine, a nether millstone engaged on the shaft, a cylindrical housing surrounding the shaft and supported on the receptacle, an upper millstone affixed in the housing in coaxial alignment with the nether millstone, a bearing for the upper end of the shaft, supported in the cylindrical housing, and adjusting means for the vertical location of the shaft, and of the nether millstone, for varying the milling gap and, thereby, the fineness of the product. In suitable embodiments the aforementioned receptacle is already available in the kitchen machine which serves as the drive for the cereal milling accessory of the invention; the other components are grouped in subassemblies readily interlocked to form the complete mill.

The cereal mill of the invention contains three major subassemblies: the driveshaft and the lower millstone mounted thereon; the cylindrical housing which retains the upper millstone and also serves as container for the grain to be milled and as the guide for the grain into the milling gap; and the cover assembly for the housing which contains the bearing for the driveshaft and allows for the adjustment of the relative heights of the millstones and accepts the axial loads produced by the milling process.

To allow for the non-rotational retention of the stationary millstone in the container, ribs may be provided in the lower portion thereof, extending inwardly and enclosed by the upper millstone.

The lower portion of the container may be designed as a separate part which is slipped into the cylindrical storage portion. This embodiment eases the manufacture of the container and of the stationary millstone located therein. The separate lower portion is made with the inwardly projecting ribs and the stationary millstone is moulded around the ribs. The lower and upper halves of the cylindrical container are then pressed together to form a solid assembly.

The invention also concerns methods for the adjustment of the milling pressure between the two millstones. This is attained, advantageously, by particular developments of the nut mating with the upper end of the shaft.

Another concern of the invention relates to the assurance that the milling faces of the two millstones run in perfect parallel alignment, a requirement for the proper operation of cereal mills.

In a cereal mill with artificial millstones and used as an accessory to a kitchen machine — where the stationary millstone is located relative to the housing of the machine and the rotating millstone is coupled to the drive of the machine — the relative alignment of the two millstones may be different each and every time the unit is assembled for use. As a consequence, the required parallelness of the two millstones cannot be ensured by purely dimensional arrangements.

This difficulty is solved, in the preferred embodiment of the invention, by the provision of an orifice through the lower millstone which is greater than the diameter of the shaft and by passing the drivepin interconnecting the shaft with the millstone through an opening pierced through the shaft at right angles to its axis of rotation.

With the millstone connected to the shaft only through the drivepin, and with the opening through the shaft formed in the shape of an elongated slot, the drivepin can be tipped along with the millstone. This relative angular motion is made possible by the clearance between the outer diameter of the shaft and the orifice through the millstone. Rotation of the crosspin around its lengthwise axis permits a tipping of the millstone in a direction orthogonal to the angular degree of freedom described above. In summation, the lower millstone is suspended in a manner analogous to a pendulum and has the freedom to tip over small angular motions in any desired wobbling movement.

A millstone suspended in the above described manner will automatically adjust its motion to run with its upper surface parallel to the milling surface of the stationary upper millstone. This approach is, of course, generally applicable to all cereal mills and will be advantageous even if the lower millstone is fixed and the upper one driven. Additional means for the proper guidance and support of the rotational millstone. will also be disclosed.

In a simple embodiment of the cereal mill, as described heretofore, it is not possible to adjust the milling gap with the aid of the suspension nut repeatably. This is largely due to wear in the millstones with time — which alters the the nut position corresponding to zero gap — and partly due to the changing angular relationship between the housing, the shaft and the nut as the latter is screwed onto the shaft. It is, therefore, necessary to adjust the milling gap, and the resulting fineness of the flour, by trial and error methods.

This difficulty is solved according to a proposal of the invention — and the adjustment of the milling fineness permitted independent of the wear of the millstones and the exact angular alignment between the shaft and the nut — by providing a disk with axial, but not angular, freedom relative to the shaft between the nut and the hub, scale markings on that disk and a co-operating index on a ring rotatable on the perimeter of the nut.

The desired milling gap may be selected - after the alignment of the disk and the index upon torquing the nut into the zero gap position — through a simple loosening of the nut to bring the index opposite the desired gap marking on the scale. The scale may be graduated in terms of the gap dimension or, if so preferred, in terms of the resulting fineness of the flour. Since the scale is on a disk which may be displaced axially along the shaft but cannot be rotated relative thereto, the adjustment is independent of the fact that the nut rotates with the shaft, or that it moves along the shaft during the adjustment.

The provision of the aforementioned disk has the additional advantage that it acts as a bearing plate for the nut and prevents the entrainment thereof during operation through frictional contact with the hub.

The invention provides additional proposals for the preferred arrangement of the index markings and for the proper positioning of same.

The preferred embodiment of the invention, and some variations thereon, will be described below in detail, with reference to the accompanying drawings.

BRIEF DESCRIPTION OF THE ACCOMPANYING DRAWINGS

The invention is illustrated in the accompanying drawings, wherein.

DESCRIPTION OF THE PREFERRED EMBODIMENT

In the following description of the preferred embodiment of the invention and some variants thereof the same reference numeral is used in the several Figures of the drawings for identical parts, and for similar parts with an identical function.

Figure 1:
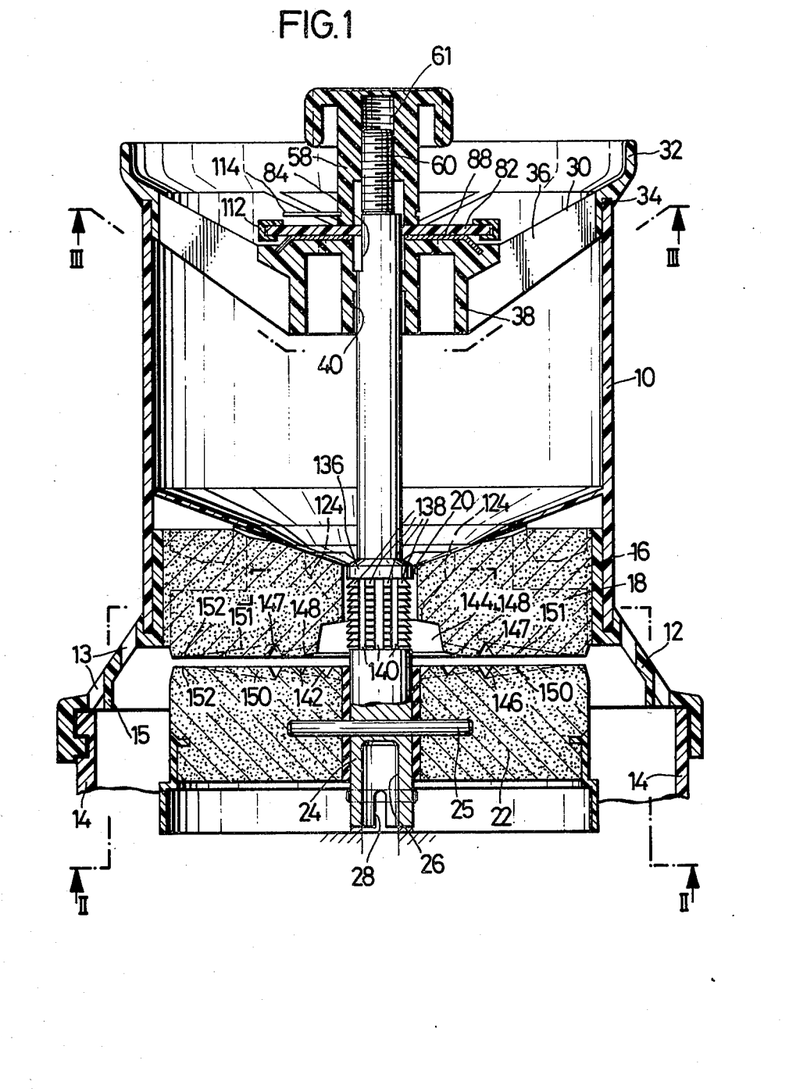
FIG. 1 is a vertical section through a cereal mill according to the invention.
Figure 2:
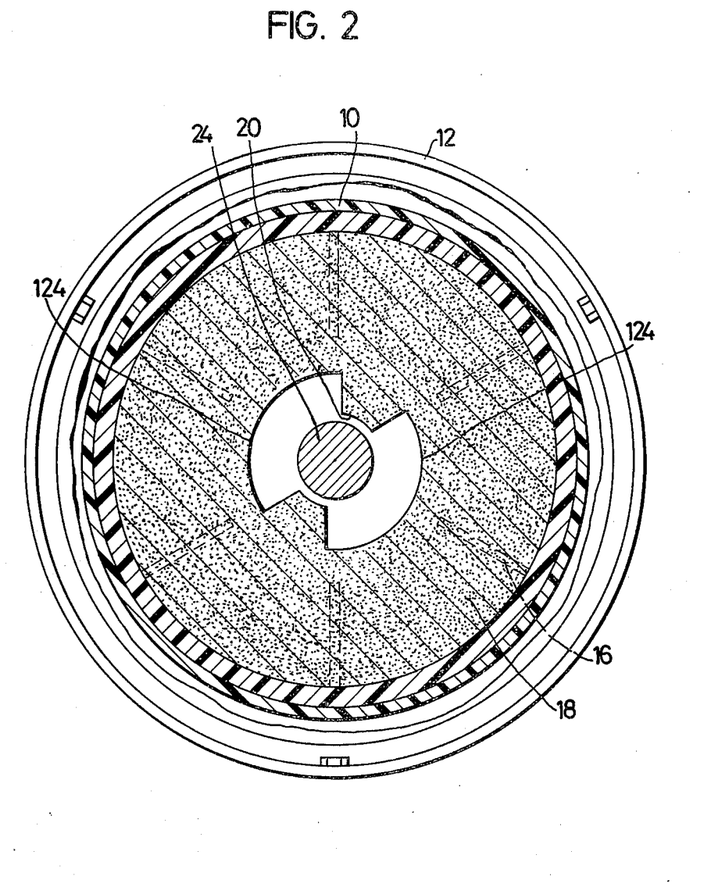
FIG. 2 is transverse section through the embodiment of FIG. 1, taken along section II—II therein.
Figure 3:
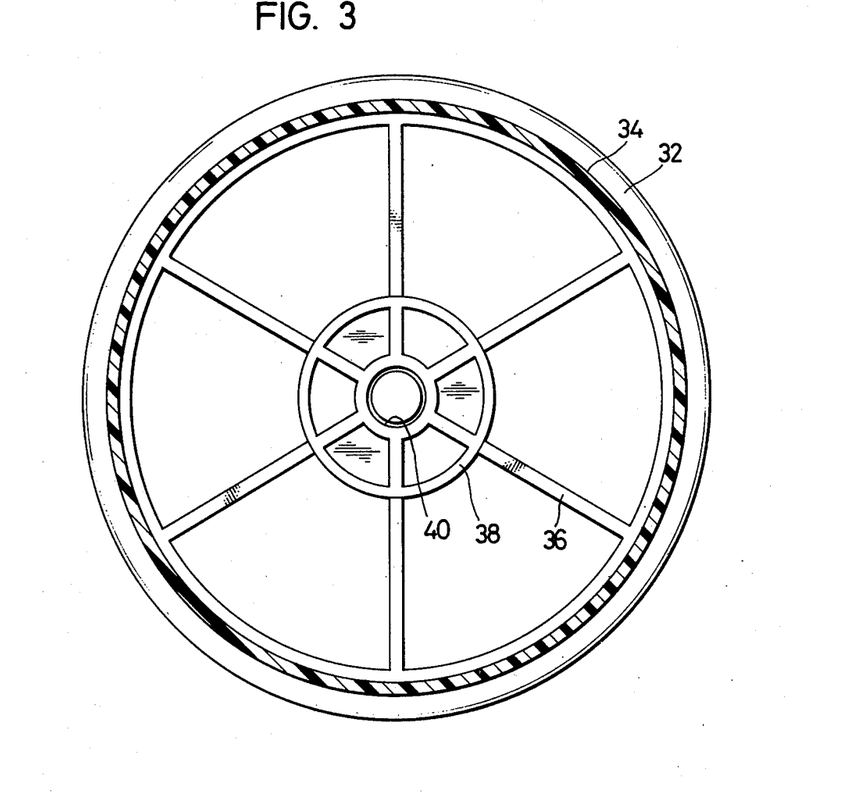
FIG. 3 is a section through the cover member of the embodiment of FIG. 1, taken along section line III—III therein.

The cereal-mill accessory of the invention, as illustrated in FIGS. 1 through 3, incorporates a cylindrical container 10, which is suitably manufactured of a plastic composition by means of injection molding. The cylindrical container 10 is provided with an enlarged lower end portion 12, with the aid of which it may be supported upon a kettle 14, which surrounds the drive of a kitchen machine concentrically. The securing of the two components — the container 10 and the kettle 14 — together may be attained in a number of ways, notably by means of a bayonet joint well known in the art. Vertical vents 13 are provided in the upper portion of the enlarged section 12, to permit air entrained with the flour to escape. To prevent the escape of flour with the excess air, the vents 13 are shielded by a suspended deflector ring 15.

The lower end of the container 10, directly above the enlarged segment 12, is provided with inwardly projecting radial ribs 16. A stationary millstone 18 is set into the container 10 in the region of the ribs 16. The millstone 18 is preferably made of stony grit particles bound in ceramic matrix and cast directly into the container 10 in such a manner that the body of the millstone encompasses the ribs 16; thereby rendering it rotationally bound with respect to the container. The upper surface of the millstone 18 is shaped in the form of a funnel which serves as a guide for the cereal grains toward a central opening 20 in the millstone, through which the grain is fed into the milling process. The container extends above the millstone a sufficient distance to provide storage for a reasonable volume of cereal to be ground into flour.

In the embodiment of FIG. 1 the expanded lower end 12 of the cylindrical container 10 is manufactured as a separate part. The inwardly projecting ribs 16, which secure the millstone 18 against rotational motion are integral parts of the sub-assembly and the millstone 18 itself is cast into the lower portion of the container which is then slipped into and secured, by a glue joint for example, to the cylindrical portion above.

A rotatable millstone 22, made of the same material as the statinary millstone 18, is set on driveshaft 24 and secured againt rotation with respect thereto. The shaft 24 passes vertically through the central supply opening 20 in the millstone 18. The shaft 24 is provided with a crosspin 25 which is secured, at either end, in the millstone 22; suitably the joint is made by casting the millstone around the crosspin 25. The driveshaft 24 is adapted to be placed over the driven output shaft of a kitchen machine and to be coupled thereto. The lower end of the shaft 24 is provided with a central bore 26, into which the output shaft of the kitchen machine may pass. The sidewall of the bore 26 is provided with slits 28 through which pin is passed and transfers the torque of the machine output shaft the driveshaft 24.

Two guide grooves 124 are provided in the perimeter of the opening 20, running spirally downward from the storage space of the container 10, and channel the grain to be milled. The grooves 124 narrow in depth toward the lower face of the millstone 18, a feature which is shown in FIG. 1.

In that region of the driveshaft 24 which is enveloped by the supply opening 20 a milling hob 136 is mounted on the shaft. The length of the hob 136 corresponds, more or less, to the thickness of the upper millstone 18. The hob 136 comprises a large number of cutting teeth 138 which are arranged in rows parallel to the axis of the shaft 24. Adjacent rows of teeth 138 are separated by gaps 140, and each row is made up of a large number of teeth. The gaps 140, being axially aligned, as are the teeth they separate from each other, form axial grooves over the entire length of the hob 136.

The surface of the lower millstone 22 facing the upper millstone 18 is marked by the provision of a spiral groove 142 in the central portion, underlying the opening 20. The groove 142 leads from the aforementioned central portion into a circular depression 146 approximately midway radially in the upper surface of the millstone 22.

The lower surface of the upper millstone 18, facing the nether millstone 22, is marked by furrows 148 opposite the spiral groove 142; these furrows run from the opening 20 to a circular depression 147, which faces the similar depression 146 in the lower millstone.

The furrows 148 run in a substantially radial alignment but are slightly canted with respect to the diameters of the upper millstone, in such a manner that they oppose the spiral of the groove 142.

The mid-radius depression 146 in the upper face of the nether millstone 22 is adjoined by a finish milling region in which curved spiral furrows 150 run outwardly from the depression 146. The furrows 150 reduce in depth as they approach the outer periphery of the millstone. Corresponding spiral furrows 151 are provided in the fine milling region of the upper millstone; these are similar in all respects to the furrows 150 but for the opposing sense of their curvature.

Near the periphery of the two millstones flat and parallel regions 152 are provided, the distance between them defining the milling gap.

The hob 136 works in conjunction with the spiral supply grooves 124 to pre-mill the feedstock. This permits the milling of a wide range of grain sizes, since all grains are reduced to a uniform feed by the time they reach the entrance of the milling region between the upper and nether millstones. A further reduction in kernel size is achieved through the groove 142 which presses the pre-milled feed agains the furrows 148 as the two stones rotate relative to one another. In the region between the furrows 150 and 151 the reduction of the feed to flour of the fineness corresponding to the preselected milling gap is attained.

A cover 30 is set upon the upper edge of the container 10; the cover includes a rim portion 32, the base of which is provided with a circular groove 34. The groove 34 is pressed over the upper edge of the container 10 at the time the two pieces are assembled together. Spoke-like fingers 36 extend inwardly from the rim 32 and support a central hub 38 in which a bearing supports the driveshaft 24 rotatably. The interstices between the fingers 36 admit the kernels to be charged into the mill for grinding. The cover may be advantageously manufactured by injection molding a plastic composition into the proper mold; the shape of the central hub 38, as illustrated, with a downwardly open U-shaped section, permits the attainment of considerable stiffness at minimal expense in material.

The upper end of the driveshaft 24 rises above the hub 38 and is manufactured with an external thread on which a nut is engaged which bears with its lower face gainst the flat upper surface of the hub. By running this nut down the shaft against the hub, the shaft, and the lower millstone 22 supported thereon, are drawn upward. It is with the aid of this nut that the gap between the upper millstone 18 and the nether millstone 22 may be regulated and the milling pressure selected.

When the mill of the invention is in operation the nut rotates, with the shaft, with respect to the hub which a part of the cover 30 and supported in a stationary condition upon the container 10. Since, in general, the nut is made of a metal, and the hub 38 of a plastic the inherent slipperiness of the surfaces will avoid excessive wear or the generation of unacceptable amounts of heat. Should it be desired, however, that the nut itself be also made of plastic, a washer made from a suitable bearing metal may be secured to the upper surface of the hub.

Figure 5:
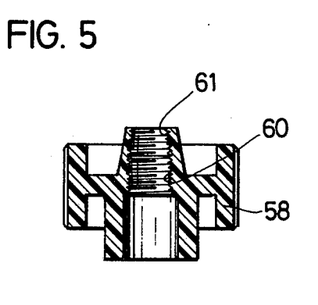
FIG. 5 is a vertical section through the shaft-securing nut of the invention, corresponding to that used in the embodiment of FIG. 1.

To ensure that the nut will remain in the preselected position, the nut 58 shown in FIG. 1, and in slightly modified form in FIG. 5, is a one-part piece of a suitably elastic plastic composition. The internal threads of this nut comprise a first region 60, of constant diameter and exactly matching the external thread of the shaft 24. Adjoining the region 60 is another threaded portion 61 which is conical in section, narrowing toward the upper end of the nut 58. The reduction in diameter, the characteristics of the plastic material, and the thickness of the nut in the region 61 are so chosen that the nut will expand upon engagement with the shaft 24; the elasticity of the material ensuring that the region 61 will develop a pressure on the shaft of sufficient magnitude to prevent unintentional rotation of the nut 58 on the threaded portion of the shaft 24.

Figure 4:
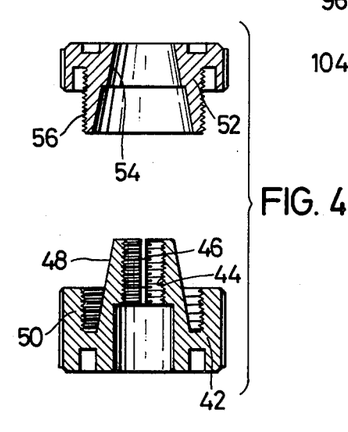
FIG. 4 is a vertical section through another embodiment of the shaft-securing nut, and capnut therefor, in a larger scale.

An alternate embodiment of the shaft-engaging component is shown in FIG. 4, wherein a nut 42 is manufactured with axial slits in an upper portion of its internal thread 44. In the region of the threaded portion 44 the nut is provided with an externally conical outer surface 48. The nut 42 is also provided with an upwardly open circumferential flange 50 which is also threaded internally, on a diameter substantially larger than the internal thread 44 which is designed to engage the shaft 24. A capnut 52 is also providied and can be into the flange 50 from above. The capnut 52 has an inner conical surface 52, corresponding the external conical surface 48, and an external thread 56 for engagement in the flange 50. When the capnut 52 is threaded into the nut 42, the vertical slits of the latter cause it to act as a flexible chuck and to securely engage the shaft 24.

The unslit portion of the thread 44 of the nut 42 — or the thread portion 60 of the nut 58 — ensure that the nuts shown can be readily and easily threaded onto the shaft 24 and permit the development of a sufficient retaining force on the shaft to sustain the required milling pressure. The senses of the thread portions 60 and 61 of nut 58 — and the threaded portions 44 of the nut 42 and 56 of the capnut 52 — are so chosen that the residual friction between the lower face of the nut and the upper surface of the hub cannot cause a loosening of the nut in service.

In the setting up of the cereal mill as an accessory to a kitchen machine the driveshaft is first placed upon the driven shaft of the machine and is coupled therewith. The container 10 is placed, next, onto the kettle 14, after the shaft 24 is passed therethrough. The cover 30 may be assembled onto the container 10 first, or it may be placed over the shaft and engaged on the upper edge of the container afterwards. Finally, the nut 58 is threaded over the shaft 24 and tightened to the point where the gap between the millstones 18 and 22 corresponds to the desired milling pressure. In the embodiment of FIG. 4 the capnut 52 is threaded into the nut 42, after the latter had been used to adjust the cereal mill to the desired milling gap. This ensures retention of the desired adjustment. The mill is now ready for use; and the grain to be ground is charged into the mill through the spaces between the spokes 36 of the cover 30. The funnel-like upper surface of the stationary millstone 18 urges the grain kernels into the central supply opening 20 and into the actual milling operation after passing the hob for a pre-milling size reduction.

The fine-milled flour leaves the gap between the millstones at their periphery and falls into the kettle 14 placed thereunder, enclosing the drive of the kitchen machine. Should it be desired that the resulting flour be further worked, this can be accomplished, at the end of the milling process, by removing the components of the cereal mill accessory, and placing a mixing or kneading in its place. The kettle 14 with load of flour may remain in place and be used in the further processing of the product.

Figure 6:
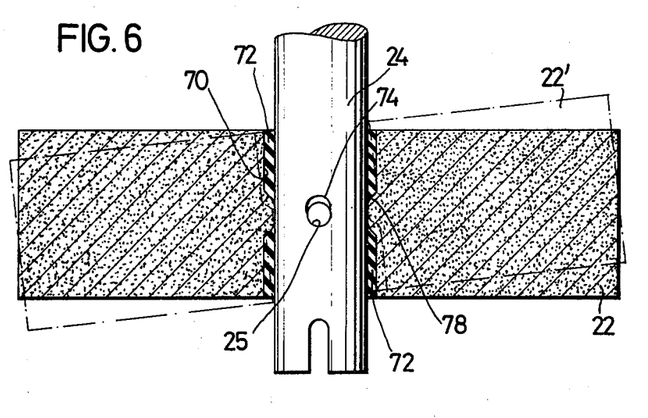
FIG. 6 is a partial section through another embodiment of the invention, showing the shaft thereof and the pendular suspension of the lower millstone thereon.
Figure 7:
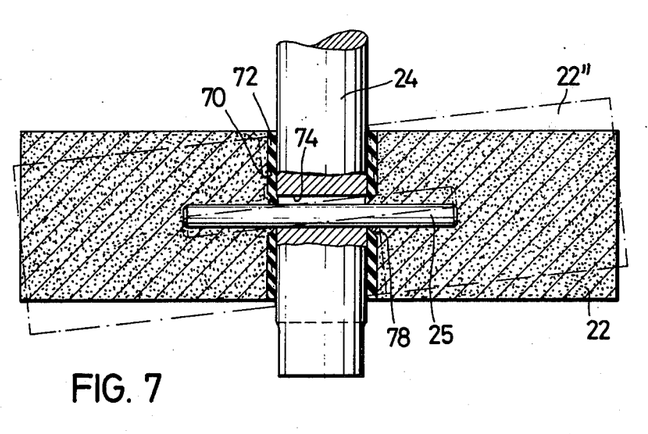
FIG. 7 is a section through the components shown in FIG. 6, taken along a sectioning plane orthogonal to that of the prior Figure.

Another embodiment of the cereal mill of the invention is shown in FIGS. 6 and 7, wherein the lower millstone 22 is provided with an axially aligned hole 70. The driveshaft 24 runs through this hole 70; its diameter being smaller than the internal diameter of the hole. An annular space 72 is created by the difference in diameters and permits a substantial angular tipping of the millstone from its normal position, at right angles to the driveshaft.

The driveshaft 24 is pierced, along a diameter passing through the centerline, by an opening 74. The lateral section of the opening 74 is in the form of an elongated slot, with the longer dimension along the shaft axis. A crosspin 25 passes through the opening 74; the pin has a circular cross-section and is cast into the matrix of the millstone 22 at either end.

At the elevation of the crosspin 25, the through hole 70 in the millstone is provided with a collar 78 extending inwardly toward the driveshaft 24. The collar 78 projects sufficiently to just barely touch the shaft periphery, and serves to center the millstone 22 with respect to the driveshaft centerline. The inner edge of the collar 78 is so rounded that it poses no resistance to the angular tipping motion of the millstone.

The free space between the wall of the hole 70 and the driveshaft 24 is filled with foam rubber. The material used is so freely compressible that it does not affect the tipping motion of the millstone. The function of the foamrubber filling is to prevent the intrusion of pre-milled grain into the space between the shaft and the hole through the millstone; such an intrusion could lead to a stopping up of the gap and prevent the pendular motion of the millstone which is important to the proper alignment of the two millstones in operation.

FIG. 6 illustrates the manner in which the millstone 22 may be tipped into an angularly displaced position 22' by tipping around the logitudinal axis of the cylindrical crosspin 25, with the crosspin rotating inside the opening 74. FIG. 7 shows a rotational displacement of the millstone around an axis displaced by 90° from that of FIG. 5, with the millstone taking up a new position 22". To achieve this the crosspin 25 is angled within the opening 74, permitted by the development of the latter as an elongated slot. Since all positions intermediate between 22' and 22" can be achieved by the superposition of partial displacement in the two mutually orthogonal tipping modes, it becomes possible for the millstone 22 to maintain a perfectly parallel alignment with respect to the lower face of the millstone 18 at all positions during its rotation.

To permit the reproducible adjustment of the milling gap, and, consequently, of the milling pressure, independently of the wear in the millstones, the adjusting nut at the upper end of the driveshaft is provided with indicator means. In the embodiment of FIG. 1, this indicator means comprises a disk 82 which is mounted on the driveshaft in an axially displacable but irrotational manner. This can be attained by providing a flat on the side of the driveshaft 24 below the threaded portion, and by suitably forming the central bore of the disk 82 to engage this flat. To prevent excessive friction between the disk 82, suitably manufactured from a plastic composition, and the hub 38, a disk of bearing metal 88 is inset into the upper surface of the latter and acts as a thrust bearing. A scale-ring 112 is provided at the periphery of the disk 82, and may be rotated relative to the disk. At the base of the nut 58 an indicator mark is provided on the periphery in the form of a pointer 114. The milling pressure is transmitted to the cover 30 by means of the nut 58 bearing on the disk 82 and the latter bearing on the hub 38.

To achieve the desired milling gap the nut 58 is first torqued down on the shaft 24 until the outer edges 152 of the co-operating millstones come into contact with each other. In this position the scale 112 is rotated relative to the disk 82 until the null point on the scale coincides with the angular position of the pointer 114. In this manner the indicator/scale combination is 'zeroed' without dependence on the knowledge of the degree of wear experienced by the millstones. The nut 58 is then backed off and the desired milling gap set with the aid of the indicator assembly, the scale of which may be calibrated in either the flour fineness or the physical dimension of the milling gap.

Figure 8:
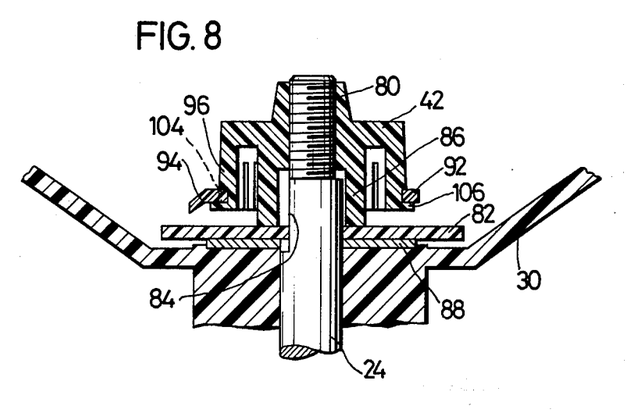
FIG. 8 is an axial section through the milling-pressure adjusting mechanism of a further embodiment of the invention.

The transverse section of FIG. 8 shows a further embodiment of the adjusting means. An externally threaded portion is provided at the upper end of the driveshaft 24 and a nut 42 is threaded thereover. A disk 82 is arranged between the lower face of the nut 42 and the cover 30 of the container. The disk 82 is keyed to the shaft 24 but is free to move along it. The nut 42 bears on the disk 82 through a projecting inner hub 86 and presses the disk against the cover 30. Since the disk 82 is rotated, when the mill is in operation, with respect to the part 30, along with the shaft 24 and the nut 42, a disk 88 is interposed between the cover 30 and the disk 82 of such a material as to ensure particularly favorable frictional properties as against the material of the disk 82.

Figure 9:
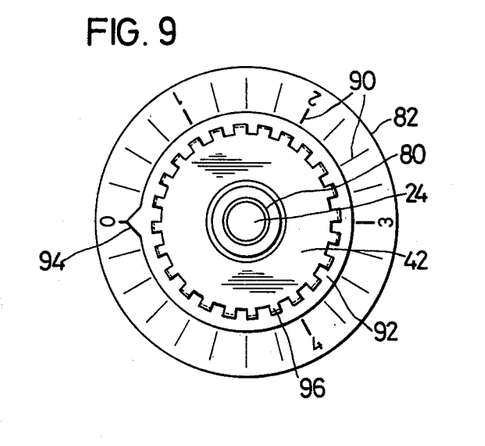
FIG. 9 is plan view corresponding to FIG. 8.

The upper surface of the disk 82 is provided with a graduated scale 90. A ring 92 is placed over the body of the nut 42 and is provided with a jutting nose 94 to form an indicator. As the nut 42 is rotated on the shaft 24 the indicator 94 traverses the scale 90 on the disk 82 and the relative positions of the millstones may be determined from the angular position of the indicator on the scale.

Figure 10:
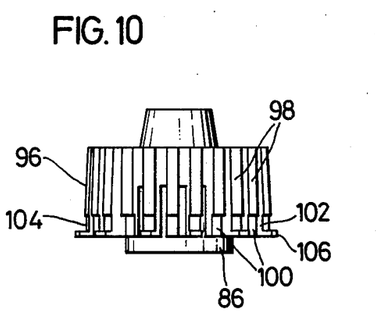
FIG. 10 is a view, in elevation, of the nut used in the mechanism of FIG. 8.
Figure 11:
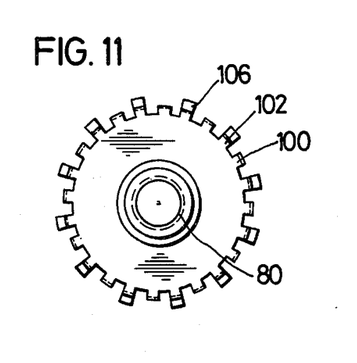
FIG. 11 is a plan view of the nut according to FIG. 10.

The nut 42 is structured with an outer portion 96 for the mounting of the ring 92; including axially aligned ribs which also serve as fingerholds in turning the nut 42. The individual ribs 98 of this outer portion 96 arise from projections 100 or 102 at their lower ends and are separated by slits. The projections 100 and 102 are provided with a circumferential flute 104 into which the ring 92 may be snapped and be secured against axial displacement.

The differentially constructed projections 102 and 100 alternate around the circumference of the nut. The projections 100 show a step in the region of the flute 104 which extends to the lower end of the portion 96. The projections 102, on the other hand, are provided with projecting end pieces 106 below the plane of the flute 104. The flute 104 forms, consequently, a break of approximately equal depth and length in the projection 102, with the length corresponding to the thickness of the ring 92.

The projections 100 and 102, respectively, perform differing functions. The projections 102 are structured more massively as a result of the end pieces 106, and show only a limited degree of deformability. They serve mainly to secure the ring 92 against an axial displacement along the suface of the nut 42. The simpler projections 100 are made with a greater inherent elasticity and are so dimensioned that flute 104 in passing through the projections 100 has a slightly larger diameter than the inner diameter of the ring 92. The projections 100 are, therefore, somewhat compressed as the ring 92 is placed into the flute 104 and press outwardly against the ring, and serve mainly to secure it against rotation with respect to the circumference of the nut 42.

In the adjustment of the desired milling gap, the nut 42 is first screwed down on the shaft 24, with the cereal mill empty of grain, until the two millstones come into contact with one another. This corresponds to a zero milling gap and the ring 92 is next rotated, against the friction developed by the projections 100 pressing against it, until the pointer 94 coincides with the zero of scale 90. The ring 92 is secured against further rotation by the projections 100 and 102; and the nut 42 can be backed off on the shaft to increase the milling gap. Since the ring 92 rotates as a unit with the nut 42 the movement of the pointer 94 indicates the instantaneous milling gap with reference to the scale 90 on the disk 82.

The cereal mill of the invention was described hereinabove with reference to the preferred embodiment thereof, and also with reference to a number of variations in the mechanical arrangement of the several parts. Further changes in the mechanical and constructional details of the device of the invention may become apparent to one skilled in the art, upon exposure to the teachings herein. It is intended that the disclosure be deemed to encompass such variations and that the invention be limited only with reference to the appended claims.

1. A cereal mill comprising a cylindrical cereal supply container adapted to be placed on a kitchen appliance having a driven shaft, said supply container having a funnel-shaped portion to supply grain to be ground and a cover; an upper millstone fixedly mounted on said supply container below said funnel-shaped portion, said supply container and upper millstone being substantially stationary during the milling operation; a vertical driveshaft extending through said upper millstone and said funnel-shaped portion and being provided at the lower end thereof with coupling means for being coupled to the driven shaft of the kitchen appliance; a lower millstone disposed below said upper millstone and mounted on said driveshaft for common rotation therewith, said upper millstone having a central supply channel dimensioned to feed grain to be ground from said funnel-shaped portion to a milling space between said millstones; and adjusting means provided at the upper end of said driveshaft and said container for selectively moving said driveshaft along the axial direction thereof relative to said stationary container to adjust the milling space between said millstones, said adjusting means being disposed on the opposite end from said coupling means with respect to said millstones and being accessible for adjustments when said mill is supported on the kitchen appliance, whereby said millstones may be adjustably spaced from one another to change the milling space prior to or durig the milling operation.

2. The cereal mill of claim 1, wherein said stationary upper millstone has an upper funnel-shaped face forming a base for said funnel-shaped portion of said container.

3. The cereal mill of claim 1, wherein said container is provided with inwardly projecting ribs in the lower portion thereof encompassed by said stationary upper millstone.

4. The cereal mill of claim 1, wherein said upper millstone is fixedly mounted on said container by means of a separate part insertable into said container.

5. The cereal mill of claim 1, wherein said coupling means comprises an end portion of said driveshaft at the opposing end from said adjusting means.

6. The cereal mill of claim 1, wherein said container has a lower enlarged portion provided with substantially vertical vents and a shield ring extending downwardly in front of at least some of said vents.

7. The cereal mill of claim 1, further comprising a crosspin passing through said driveshaft with the ends of said crosspin being fixed in said lower millstone.

8. The cereal mill of claim 7, wherein said lower millstone is provided with a bore generally coaxial with said driveshaft passing centrally therethrough and having a diameter larger than the diameter of said driveshaft extending therethrough; and said driveshaft being provided with an elongated opening generally tranverse to the axis thereof and extending therethrough, said opening being dimensioned to receive said crosspin, and wherein said elongated opening is additionally elongated along the axes of said driveshaft to provide a clearance between said crosspin and said bore, whereby said crosspin and said lower millstone have a limited degree of movement along the axis of said driveshaft.

9. The cereal mill of claim 8, further comprising a collar having a portion projecting over at least a part of said bore in said lower millstone to engage said crosspin.

10. The cereal mill of claim 9, wherein a rounded edge is provided on the projecting portion of said collar proximate to said bore.

11. The cereal mill of claim 8, wherein the space between the inner face of said bore and said driveshaft is filled with an elastically yielding material.

12. The cereal mill of claim 11, wherein said material is foam rubber.

13. The cereal mill of claim 7, wherein said crosspin is embedded in the matrix of said lower millstone.

14. The cereal mill of claim 1, wherein said cover comprises a central hub, and a plurality of radial spokes supporting said hub, said driveshaft projecting through said hub and being rotatably journalled therethrough.

15. The cereal mill of claim 14, further comprising a disk mounted on said driveshaft for common rotation therewith and slidably mounted on said driveshaft for relative axial movements therewith between said adjusting means and said hub in said cover; and a scale mounted on said disk which cooperates with a marker on said adjusting means.

16. The cereal mill of claim 15, wherein said adjusting means includes a nut threadedly mounted on said driveshaft, and wherein said marker is in the form of a ring provided with a mark and engagable and lockable on the periphery of said nut.

17. The cereal mill of claim 16, wherein said ring is elastically deformable against said nut.

18. The cereal mill of claim 17, wherein said nut is provided with external ribs, terminating in freely springable projections separated from one another and adapted to receive said ring and retain same by pressing against the inner diameter thereof.

19. The cereal mill of claim 18, wherein said projections are provided with radial flutes whereby said ring may be snapped into position and secured against axial displacement.

20. The cereal mill of claim 19, wherein said projections alternate around said nut and wherein said flutes have reduced diameters extending to the ends of said projections, while said alternate projections terminate in further projecting fingers below said flutes.

21. The cereal mill of claim 14, wherein said adjusting means includes a threaded nut mounted on an upper threaded portion of said driveshaft and above said central hub and a mating threaded capnut coaxially arranged on said driveshaft, and wherein said nut is provided with axial slits along one portion of its thread and formed with a conical external surface, and wherein said capnut is provided with an inner conical surface, whereby rotation of said nut adjusts the position of said driveshaft and said nut may be locked against said driveshaft upon the threading of said capnut thereagainst.

22. The cereal mill of claim 14, wherein said adjusting means includes a threaded nut mounted on an upper threaded portion of said driveshaft and above said hub and having an internal thread formed with an inwardly narrowing portion which is made of a material and dimensioned to be resilient to permit its expansion by being screwed on said shaft, whereby said unit is resiliently retained in its adjusted position.

23. The cereal mill of claim 22, wherein said material is a plastic composition.

24. The cereal mill of claim 1, wherein said supply container has a cover with a central hub, and wherein said adjusting means includes a nut threadedly mounted on said driveshaft above said hub and further comprising an indicator disk fixedly mounted on said driveshaft to share the rotational movements thereof and slidably mounted with respect to said driveshaft to permit relative axial movements between said nut and said hub on said cover supported upon said container, said indicator disk being provided with a circular scale angularly displaceable with respect thereto, and wherein said nut is provided with a pointer at its periphery.

25. The cereal mill of claim 24, further comprising a bearing disk inset in the upper portion of said cover immediately below said indicator disk fixedly mounted on said driveshaft by said nut to share the rotational movements thereof.

26. The cereal mill of claim 25, wherein said bearing disk is constructed from a friction reducing material.

* * * * *